United States Patent
Hardege et al.

(10) Patent No.: US 12,317,872 B2
(45) Date of Patent: Jun. 3, 2025

(54) METHODS OF TRAPPING CRUSTACEANS

(71) Applicant: The University of Hull, Kingston upon Hull (GB)

(72) Inventors: Jorg Hardege, Kingston upon Hull (GB); Nichola Fletcher, Kingston upon Hull (GB); John Terschak, Kingston upon Hull (GB); Jonathan William Burnett, Kingston upon Hull (GB)

(73) Assignee: The University of Hull (GB)

( * ) Notice: Subject to any disclaimer, the term of this patent is extended or adjusted under 35 U.S.C. 154(b) by 602 days.

(21) Appl. No.: 17/639,454

(22) PCT Filed: Sep. 2, 2020

(86) PCT No.: PCT/GB2020/052098
§ 371 (c)(1),
(2) Date: Mar. 1, 2022

(87) PCT Pub. No.: WO2021/044138
PCT Pub. Date: Mar. 11, 2021

(65) Prior Publication Data
US 2022/0272951 A1    Sep. 1, 2022

(30) Foreign Application Priority Data
Sep. 2, 2019 (GB) .................... 1912599

(51) Int. Cl.
*A01K 61/59* (2017.01)
*A23K 10/22* (2016.01)
*A23K 50/80* (2016.01)

(52) U.S. Cl.
CPC .............. *A01K 61/59* (2017.01); *A23K 10/22* (2016.05); *A23K 50/80* (2016.05)

(58) Field of Classification Search
CPC ......... A01K 61/59; A23K 50/80; A23K 10/22
See application file for complete search history.

(56) References Cited

U.S. PATENT DOCUMENTS

| | | | |
|---|---|---|---|
| 5,133,959 A | 7/1992 | Kumins et al. | |
| 2018/0049419 A1 | 2/2018 | Robertson et al. | |

FOREIGN PATENT DOCUMENTS

| | | |
|---|---|---|
| CN | 103004717 A | 4/2013 |
| CN | 109090343 A | 12/2018 |
| WO | WO2004/073394 A2 | 9/2004 |
| WO | WO2019/148062 A1 | 8/2019 |

OTHER PUBLICATIONS

Bulblitz et al (Behavior 145(10) 1465-1478 (2008)).*
Search Report for GB1912599.6, mailed on Jan. 23, 2020.
Written Opinion of the International Search Authority for PCT/GB2020/052098, mailed on Oct. 30, 2020.
JD Hardege et al, "Identification of a female sex pheromone in Carcinus maenas", Marine Ecology Progress Series., vol. 436, Aug. 31, 2011 (Aug. 31, 2011), p. 177-189, XP055743363.
Fletcher N et al, "The cost of conflict: agonistic encounters influence responses to chemical signals in the European shore crab", Feb. 1, 2009 (Feb. 1, 2009), vol. 77, No. 2, p. 357-361.
Zhang Dong et al, "Characterization of a sex pheromone in a simultaneous hermaphroditic shrimp,*Lysmata wurdemanni*", Sep. 16, 2009 (Sep. 16, 2009), vol. 157, No. 1, p. 1-6.
Asai N et al, "Sex Pheromones of the Hair Crab *Erimacrus isenbeckii*. Part 1: Isolation and Structures of Novel Ceramides", Tetrahedron, Elsevier Science Publishers, Amsterdam, NL,vol. 56, No. 51, Dec. 15, 2000 (Dec. 15, 2000), p. 9895-9899.
Mattias Ekerholm et al, "Primer and Short-Range Releaser Pheromone Properties of Premolt Female Urine from the Shore Crab *Carcinus maenas*", Journal of Chemical Ecology, Kluwer Academic Publishers—Plenum Publishers, NE,vol. 31, No. 8, Aug. 1, 2005 (Aug. 1, 2005), p. 1845-1864.
Examination Report for European Patent Application No. 20768661. 9-1118, mailed on Dec. 21, 2022.

* cited by examiner

*Primary Examiner* — Shirley V Gembeh
(74) *Attorney, Agent, or Firm* — Shackelford, McKinley & Norton, LLP (57) ABSTRACT

The present invention provides a delivery matrix comprising a carbohydrate derivative and at least one semiochemical for trapping and/or attracting and/or deterring at least one aquatic organism. The present invention provides a method for trapping and/or attracting a crustacean, said method comprising delivering an effective amount of specific semiochemicals.

12 Claims, 5 Drawing Sheets

METHODS OF TRAPPING CRUSTACEANS

FIELD OF INVENTION

The present invention relates generally to methods for trapping and/or attracting a crustacean, said method comprising delivering an effective amount of a semiochemical to an aquatic environment. The present invention also relates generally to a use of a semiochemical for trapping and/or attracting a crustacean.

The present invention also relates generally to delivery matrices comprising carboxymethylcellulose and semiochemicals and their uses in trapping and/or attracting and/or deterring aquatic organisms, in particular crustaceans.

BACKGROUND TO THE INVENTION

Over recent years, there have been significant innovations in integrated pest management and the control of invasive species, such as insects. However, very few practical solutions have been developed for trapping and managing aquatic organisms, such as crustaceans. It is well documented that 'pest' aquatic species such as crustaceans, fish and molluscs, negatively impact aquaculture, fisheries, ecosystem stability, biodiversity and general ecosystem services. Most research to date has focused on the detection and monitoring of these pest species, however, control and/or eradication methods lag behind substantially. For example, crustaceans are traditionally trapped using fish bait. Not only does this common method lack species specificity as it also traps non-target species, it uses valuable and expensive resources (such as squid and/or tuna), and potentially transfers diseases across the food-chain.

Key examples of invasive crustacean, fish and mollusc species include *Carcinus maenas* (shore crab), *Potamocorbula amurensis* (Asian clam) and *Oncorhynchus mykiss* (rainbow trout), which are all listed IUCN's Invasive Species Specialist Group as the top 100 worst invasive species in the world. Shore crabs, also known as the green crab, are amongst the top 10 marine invasive/pest species, causing damage to mussel populations, juvenile fish and in general all smaller marine life that are considered as prey by the shore crabs. The shore crab is native to Europe and the North East Atlantic, with a wide distribution spanning from Scandinavia and northern Europe, throughout the Mediterranean and along the northern coast of Africa. However, the shore crabs have spread globally, into Australia, Canada, the USA and South America, resulting in ecological and economic damage to native ecosystems and local aquaculture industries such as clam, mussel, scallop and oyster farms. The invasiveness of shore crabs along the west coast of the USA has recently been highlighted by their relentless spread into Oregon, Washington and Canada, for example, in Vancouver Island where entire mussel populations were wiped out. Specifically, higher numbers of female shore crabs have been reported in nearshore habitats during reproductive periods, in salinities of about 13 ppt to about 53 ppt, and in temperatures of up to about 18° C. to about 26° C.

It is known in the art that chemical signals and compounds are exchanged between organisms for the purposes of communication, for example, many animal species use similar or identical chemical compounds as sex attractants, often in the form of bouquets. Chemical communication is also widespread in aquatic species, particularly as other communication methods are often limited due to the complexity of the environment, e.g. poor light conditions, turbid waters, substrate and vegetation.

Among the crustacea, interspecific behavioural activity induced by female sex pheromones has been demonstrated in *C. maenas* and *Macropipus depurator* (see, for example: Seifert, P., Ophelia (1982) 21: 147-158), whereby males perform sexual behaviour towards a freshly moulted female of the other species. The existence of sex pheromones in crustaceans and its link with the moult of females has been described in a number of species including *C. maenas* (see, for example: Berrill, M. et al., Bull. Mar. Sci. (1982) 32: 632-638; Seifert (1982); Bamber, S. D. et al., J. Mar. Bio. Ass. UK (1996) 76: 691-699; Bamber, S. D. et al., Estuar. Coast. Shelf Sci. (1997) 44: 195-202; Hardege, J. D. et al., Mar. Ecol. Progr. Ser. (2002) 244: 179-189). Starting several days before the moult and up to a week after ecdysis, female shore crabs release sex-pheromones which attract males and induce mate guarding behaviour (see, for example: Bamber, S. D. et al., Mar. Behay. Physiol. (1996) 125: 483-488).

Hardege J. D. et al., Mar. Ecol. Prog. Ser. (2011) 436: 177-189, identified a crustacean sex pheromone, specifically the female signal produced by shore crabs from both conditioned seawater and female urine. Hardege et al., specified uridine diphosphate (UDP) as a major component of the female crab pheromone, which induced all key characteristics of male sexual behaviour at a threshold of $10^{-5}$ mol/L UDP in seawater.

Bublitz R. et al., Behaviour (2008) 145: 1465-1478, also identified that in *C. maenas*, UDP was shown to be the primary female sex pheromone, and discussed that in other research (see, for example, Fletcher N., Behavioural complexities in the European shore crab, Carcinus maenas, PhD thesis, The University of Hull (2007) 1-130), the incorporation of nucleotide uridine triphosphate (UTP), when mixed in the ratio of 4:1, increases the mating response in male shore crabs. Bublitz et al., further demonstrated that the female sex-pheromone UDP is not species specific but is present and active in some other decapod crustaceans. However, whilst Bublitz et al. discusses and therefore discloses UDP:UTP in a 4:1 ratio as a mixture with high biological activity, there is no disclosure that this combination of pheromones could be used for trapping and managing species specific aquatic organisms.

The present invention provides methods for trapping and/or attracting a crustacean, said method comprising delivering an effective amount of a semiochemical selected from the group consisting of 2-phenylethylamine, dopamine, L-DOPA, noradrenaline, adrenaline, chondroitin-sulfate uridine diphosphate (UDP), uridine triphosphate (UTP) and glutathione. The present invention provides a use of a semiochemical selected from the group consisting of 2-phenylethylamine, dopamine, L-DOPA, noradrenaline, adrenaline, chondroitin-sulfate uridine diphosphate (UDP), uridine triphosphate (UTP) and glutathione for trapping and/or attracting a crustacean.

The present invention provides semiochemical delivery matrices comprising a carbohydrate derivative, for trapping and/or attracting and/or deterring at least one aquatic organism.

The Invention

According to one aspect of the present invention, there is provided a method for trapping and/or attracting a crustacean, said method comprising delivering an effective amount of a semiochemical selected from the group consisting of: 2-phenylethylamine, dopamine, L-DOPA, noradrenaline, adrenaline, chondroitin-sulfate, uridine diphosphate (UDP), uridine triphosphate (UTP) and glutathione to an aquatic environment.

In an embodiment, the method for trapping and/or attracting a crustacean comprises: (1) delivering the effective amount of the semiochemical selected from the group consisting of: 2-phenylethylamine, dopamine, L-DOPA, noradrenaline, adrenaline, chondroitin-sulfate, uridine diphosphate (UDP), uridine triphosphate (UTP) and glutathione to an aquatic environment; and (2) removing the trapped crustacean from the aquatic environment.

In an embodiment, step of delivering the effective amount of the semiochemical to an aquatic environment involves adding the semiochemical to a trap that allows the crustacean to enter, but does not allow the crustacean to escape.

In an embodiment, step of delivering the effective amount of the semiochemical to an aquatic environment involves adding the semiochemical to a trap that allows the crustacean to enter, does not allow the larger crustaceans to escape but allows smaller crustaceans to escape.

In an embodiment, the method comprises delivering one semiochemical (i.e. no more than one semiochemical). In another embodiment, the method comprises delivering more than one semiochemical, for example 2, 3, 4 or 5 semiochemicals.

According to another aspect of the present invention, there is provided a use of a semiochemical selected from the group consisting of 2-phenylethylamine, dopamine, L-DOPA, noradrenaline, adrenaline, chondroitin-sulfate, uridine diphosphate (UDP), uridine triphosphate (UTP) and glutathione for trapping and/or attracting a crustacean.

In an embodiment, the use comprises one semiochemical (i.e. no more than one semiochemical). In another embodiment, the use comprises more than one semiochemical, for example 2, 3, 4 or 5 semiochemicals.

According to another aspect of the present invention, there is provided a delivery matrix comprising a carbohydrate derivative and at least one semiochemical for trapping and/or attracting and/or deterring at least one aquatic organism, e.g. a crustacean. The semiochemical may be selected from the group consisting of 2-phenylethylamine, dopamine, L-DOPA, noradrenaline, adrenaline, chondroitin-sulfate, uridine diphosphate (UDP), uridine triphosphate (UTP) and glutathione.

In an embodiment, the delivery matrix is a gel matrix.

In an embodiment, the carbohydrate derivative is a cellulose derivative. In an embodiment, the carbohydrate derivate may be selected from the group consisting of carboxymethylcellulose, croscarmellose sodium, chitin, chitosan, hydroxypropyl cellulose or methyl cellulose. In an embodiment, the carbohydrate derivate may be selected from the group consisting of carboxymethylcellulose, croscarmellose sodium, chitin, hydroxypropyl cellulose or methyl cellulose. It may be that the delivery matrix comprises more than one carbohydrate derivative, wherein the more than one carbohydrate derivative is selected from the group consisting of carboxymethylcellulose, croscarmellose sodium, chitin, hydroxypropyl cellulose or methyl cellulose. Preferably, the carbohydrate derivative is carboxymethylcellulose.

In an embodiment, the delivery matrix comprises a carbohydrate derivative, wherein the carbohydrate derivative is carboxymethylcellulose.

In an embodiment, the carboxymethylcellulose may be selected from low, medium, high or ultra-high viscosity carboxymethylcellulose. Wherein low viscosity carboxymethylcellulose has a viscosity of about 50 centipoise to about 200 centipoise (cps) in a 4% aqueous solution at 25° C. (about 90000 molecular weight average), medium viscosity carboxymethylcellulose has a viscosity of about 500 cps to about 800 cps in a 2% aqueous solution at 25° C. (about 250000 molecular weight average), high viscosity carboxymethylcellulose has a viscosity of about 1500 cps to about 3000 cps in a 1% aqueous solution at 25° C. (about 700000 molecular weight average), and ultra-high viscosity carboxymethylcellulose has a viscosity of about 1500 cps to about 4500 cps in a 1% aqueous solution at 25° C. (about 1000000 molecular weight average).

In an embodiment, the carbohydrate derivative is selected from one or more low, medium, high and/or ultra-high viscosity carboxymethylcellulose.

Optionally, the delivery matrix comprises medium viscosity carboxymethylcellulose.

In an embodiment, the delivery matrix may comprise the carbohydrate derivative in about 1% w/v to about 50% w/v, optionally about 5% w/v to about 25% w/v, optionally about 5% w/v to about 15% w/v, optionally about 5, 6, 7, 8, 9, 10, 11, 12, 13, 14 or 15% w/v.

In an embodiment, the delivery matrix comprises a carbohydrate derivative in about 10% w/v.

In an embodiment, the delivery matrix comprises carboxymethylcellulose in about 10% w/v.

In an embodiment, the delivery matrix comprises medium viscosity carboxymethylcellulose in about 10% w/v.

In an embodiment, the delivery matrix may comprise one semiochemical (i.e. no more than one semiochemical). In another embodiment, the delivery matrix may comprise more than one semiochemical, for example 2, 3, 4 or 5 semiochemicals. Preferably, the delivery matrix comprises two semiochemicals.

In an embodiment, the delivery matrix comprises at least one semiochemical, which is species specific. Optionally, the delivery matrix may comprise one semiochemical (i.e. no more than one semiochemical), which is species specific. Optionally, the delivery matrix may comprise more than one semiochemical, wherein at least one semiochemical is species specific. Optionally, the delivery matrix may comprise two semiochemicals, wherein one semiochemical is species specific and one semiochemical is not species specific. Optionally, the delivery matrix may comprise two semiochemicals, wherein both semiochemicals are species specific.

In an embodiment, the delivery matrix comprises at least one semiochemical which is not specifies specific.

In an embodiment, the delivery matrix comprises at least one semiochemical, none of which are species specific.

In an embodiment, the at least one semiochemical may be selected from the group consisting of pheromones, allomones, kairomones and/or synomones. It may be that the delivery matrix comprises at least one pheromone.

In an embodiment, the delivery matrix may comprise at least one pheromone. Optionally, the delivery matrix may comprise one pheromone (i.e. no more than one pheromone). Optionally, the delivery matrix may comprise more than one pheromone, for example 2, 3, 4 or 5 pheromones. Preferably, the delivery matrix comprises two pheromones.

In an embodiment, the delivery matrix may comprise at least one pheromone, which is species specific. Optionally, the delivery matrix may comprise one pheromone which is species specific (i.e. no more than one pheromone which is species specific). Optionally, the delivery matrix may comprise more than one pheromone, wherein at least one pheromone is species specific. Optionally, the delivery matrix may comprise two pheromones, wherein one pheromone is species specific and one pheromone is not species specific. Optionally, the delivery matrix may comprise two pheromones, wherein both pheromones are species specific.

In an embodiment, the delivery matrix comprises at least one pheromone which is not specifies specific.

In an embodiment, the delivery matrix comprises at least one pheromone, none of which are species specific.

In an embodiment, the at least one aquatic organism is selected from a pest species, invasive species and/or commercially trapped species. Optionally, the at least one aquatic organism may be a pest and/or invasive species.

In an embodiment, the at least one aquatic organism may be a non-pest species. Thus, the delivery matrix as described herein, may be used to attract non-pest species.

In an embodiment, the at least one aquatic organism is selected from the group consisting of molluscs, fish and crustaceans. Preferably the at least one aquatic organism is a crustacean. In an embodiment, the at least one aquatic organism may be a pest species, invasive species and/or commercially trapped species selected from the group consisting of molluscs, fish and crustaceans. Optionally, the at least one aquatic organism may be a pest and/or invasive species selected from the group consisting of molluscs, fish and crustaceans. Optionally, the at least one aquatic organism may be a pest and/or invasive crustacean. Optionally, the crustacean may be selected from crabs, lobsters, crayfish and shrimp. Optionally, the crustacean may be selected from the group consisting of *Cancer magister*, *Cancer pagurus*, *Homarus americanus*, *Homarus gammarus*, *Penaeus vannamei*, *Penaeus monodon*, *Callinectes sapidus* (blue crab), *Necora puber* (swimming crab), *Maja brachydactyla* (spider crab), *Paralithodes camtschaticus* (red king crab), *Eriocheir sinensis* (mitten crab), *Panulirus* (spiny lobster), *Chionoecetes opilio* (snow crab), *Carcinus maenas* (shore crab) and *Paguroidea* (hermit crab). Optionally, the at least one aquatic organism may be a pest and/or invasive crab species. Preferably, the pest and/or invasive crab species may be *Carcinus maenas*, also known as the shore crab, green crab, and/or green shore crab. Preferably, the pest and/or invasive crab species may be *Paguroidea*, also known as the hermit crab.

In an embodiment, the delivery matrix as described herein, may be used to attract and/or trap pest and/or invasive crabs species, preferably shore crabs. Optionally, the at least one aquatic organism is a male shore crab. Optionally, the at least one aquatic organism is a female shore crab. Optionally, the at least one aquatic organism is a male and/or female shore crab.

In an embodiment, the delivery matrix as described herein, may be used to attract and/or trap pest and/or invasive crabs species, preferably hermit crabs. Optionally, the at least one aquatic organism is a male hermit crab. Optionally, the at least one aquatic organism is a female hermit crab. Optionally, the at least one aquatic organism is a male and/or female hermit crab.

In an embodiment, the delivery matrix comprises at least one semiochemical in a concentration of between about $10^{-2}$ mol/L to about $10^{-6}$ mol/L, optionally about $10^{-3}$ mol/L to about $10^{-5}$ mol/L, or optionally about $10^{-4}$ mol/L. It may be that the delivery matrix comprises $10^{-4}$ mol/L of at least one semiochemical.

In an embodiment, the delivery matrix comprises at least one pheromone in a concentration of between about $10^{-2}$ mol/L to about $10^{-6}$ mol/L, optionally about $10^{-3}$ mol/L to about $10^{-6}$ mol/L, optionally about $10^{-3}$ mol/L to about $10^{-5}$ mol/L, or optionally about $10^{-4}$ mol/L. It may be that the delivery matrix comprises $10^{-4}$ mol/L of at least one pheromone. As it will be appreciated, the concentration of semiochemical/pheromone can be selected dependent on the size and number of aquatic organisms to be trapped.

In an embodiment, the delivery matrix is prepared in an aqueous solution. It may be that the aqueous solution is water. It may be that the water is seawater. It may be that the delivery matrix comprises an aqueous solution of a carbohydrate derivative and at least one semiochemical. It may be that the delivery matrix comprises an aqueous solution of carboxymethylcellulose and at least one semiochemical. It may be that the delivery matrix comprises an aqueous solution of medium viscosity carboxymethylcellulose and at least one semiochemical. It may be that the delivery matrix comprises an aqueous solution of medium viscosity carboxymethylcellulose in about 10% w/v, and $10^{-4}$ mol/L of at least one semiochemical.

In an embodiment, the semiochemical is 2-phenylethylamine. In an embodiment, the semiochemical is dopamine. In an embodiment, the semiochemical is L-DOPA. In an embodiment, the semiochemical is noradrenaline. In an embodiment, the semiochemical is adrenaline. When the semiochemical is selected from the group consisting of 2-phenylethylamine, dopamine, L-DOPA, noradrenaline and adrenaline and predominantly female crustaceans are trapped and/or attracted (i.e. of the crustaceans trapped and/or attracted, more than 50%, preferably more than 60%, more preferably more than 70% and yet more preferably more than 80% are female crustaceans). In an embodiment, the semiochemical is 2-phenylethylamine and the crustacean is female. In an embodiment, the semiochemical is dopamine and the crustacean is female. In an embodiment, the semiochemical is L-DOPA and the crustacean is female. In an embodiment, the semiochemical is noradrenaline and the crustacean is female. In an embodiment, the semiochemical is adrenaline and the crustacean is female. In an embodiment, the semiochemical is 2-phenylethylamine and the crustacean is a female *Carcinus maenas* (shore crab). In an embodiment, the semiochemical is dopamine and the crustacean is a female *Carcinus maenas* (shore crab). In an embodiment, the semiochemical is L-DOPA and the crustacean is a female *Carcinus maenas* (shore crab). In an embodiment, the semiochemical is noradrenaline and the crustacean is a female *Carcinus maenas* (shore crab). In an embodiment, the semiochemical is adrenaline and the crustacean is a female *Carcinus maenas* (shore crab).

In an embodiment, the semiochemical is chondroitin sulphate. In an embodiment, the semiochemical is chondroitin sulphate and the crustacean is a male and/or female crustacean (i.e. both male and female crustaceans may be trapped and/or attracted). In an embodiment, the semiochemical is chondroitin sulphate and the crustacean is a male and/or female *Carcinus maenas* (shore crab).

In an embodiment, the semiochemical is UDP. In an embodiment, the semiochemical is UTP. In an embodiment, the semiochemical is a mixture of UTP and UDP. In an embodiment, the semiochemical is UTP and/or UDP and the crustacean is a male and female crustacean (i.e. both male and female crustaceans are trapped and/or attracted). In an embodiment, the semiochemical is UDP and the crustacean is a male and female Carcinus maenas (shore crab). In an embodiment, the semiochemical is UTP and the crustacean is a male and female *Carcinus maenas* (shore crab). In an embodiment, the semiochemical is UDP and/or UTP and the crustacean is a male and female *Carcinus maenas* (shore crab).

In an embodiment, the semiochemical is glutathione. In an embodiment, the semiochemical is glutathione and the crustacean is a male and/or female crustacean (i.e. both male and female crustaceans may be trapped and/or attracted). In an embodiment, the semiochemical is glutathione and the crustacean is a male and/or female *Paguroidea* (hermit crab). In an embodiment, the semiochemical is glutathione and the crustacean is a male and/or female *Carcinus maenas* (shore crab).

In an embodiment, a mixture of two or more of the aforementioned semiochemicals is used in the method, use or delivery matrix of the present invention. It may be that the ratio of any of the above semiochemicals is between about 10:1 to about 1:1, optionally between about 6:1 to 2:1, or preferably about 4:1. It may be that the ratio of any of the above semiochemicals is between about 1:10 to about 1:1, optionally between about 1:6 to about 1:2, or optionally about 1:4 to about 1:3. For example, a mixture of UDP and UTP is particularly advantageous. It may be that the ratio of UDP:UTP is between about 10:1 to about 1:1, optionally between about 6:1 to about 2:1, or preferably about 4:1. It may be that the ratio of UDP:UTP is between about 1:10 to about 1:1, optionally between about 1:6 to about 1:2, or optionally about 1:4 to about 1:3.

In an embodiment, the at least one semiochemical is UDP and UTP, wherein UDP and UTP are present in the delivery matrix in a ratio of 4:1 of UDP:UTP. In an embodiment, the at least one semiochemical is at least one pheromone, wherein the at least one pheromone is UDP and UTP, wherein UDP and UTP are present in the delivery matrix in a ratio of 4:1 of UDP:UTP. In an embodiment, the at least one semiochemical is a "post-moult" pheromone bouquet, wherein the "post-moult" pheromone bouquet is UDP and UTP, wherein UDP and UTP are present in the delivery matrix in a ratio of 4:1 of UDP:UTP.

In an embodiment, there is provided a delivery matrix comprising about 1% w/v to about 50% w/v of carbohydrate derivative, preferably 10% w/v carboxymethylcellulose, and $10^{-2}$ mol/L to about $10^{-6}$ mol/L of at least one semiochemical, preferably $10^{-4}$ mol/L of UDP:UTP in a ratio of 4:1, prepared in water, for trapping at least one aquatic organism, preferably pest and/or invasive male and/or female shore crabs.

In an embodiment, there is provided a delivery matrix comprising 10% w/v carboxymethylcellulose, and $10^{-4}$ mol/L of UDP:UTP in a ratio of 4:1, prepared in water, for trapping pest and/or invasive male and/or female shore crabs.

In an embodiment, there is provided a delivery matrix comprising 10% w/v medium viscosity carboxymethylcellulose, and $10^{-4}$ mol/L of UDP:UTP in a ratio of 4:1, prepared in water, for trapping pest and/or invasive male and/or female shore crabs.

In an embodiment, there is provided a delivery matrix comprising 10% w/v medium viscosity carboxymethylcellulose, and $10^{-4}$ mol/L of UDP:UTP in a ratio of 4:1, prepared in seawater, for trapping pest and/or invasive male and/or female shore crabs.

According to a further aspect of the invention, there is provided a delivery matrix as defined herein, which may be adapted for controlled time-release of the at least one semiochemical. It may be that the delivery matrix is adapted for controlled time-release of the at least one semiochemical up to about 168 h. It may be that the delivery matrix is adapted to release the at least one semiochemical at about 12 h. It may be that the delivery matrix is adapted to release the at least one semiochemical at about 24 h. It may be that the delivery matrix is adapted to release the at least one semiochemical at about 48 h. It may be that the delivery matrix is adapted to release the at least one semiochemical at about 168 h. It may be that the delivery matrix is not adapted for controlled time-release of the at least one semiochemical. It may be that the delivery matrix is adapted for continuous release of the at least one semiochemical. It may be that the delivery matrix is adapted for controlled time-release at one or more time points, of the at least one semiochemical.

It may be that the delivery matrix as defined herein, is adapted for controlled time-release of the at least one semiochemical, by altering the viscosity of the carbohydrate derivative, wherein the carbohydrate derivative may be selected from at least one of low, medium, high or ultra-high viscosity carboxymethylcellulose. It may be that the delivery matrix which is adapted for controlled time-release of the at least one semiochemical, comprises medium viscosity carboxymethylcellulose. It may be that the delivery matrix which is adapted for controlled time-release of UDP:UTP in a ratio of 4:1, comprises medium viscosity carboxymethylcellulose. It may be that the delivery matrix which is adapted for controlled time-release of $10^{-4}$ mol/L of UDP:UTP in a ratio of 4:1, comprises 10% w/v medium viscosity carboxymethylcellulose.

Further provided is a delivery matrix as defined herein, for use in aquatic environments. It may be that the pH of the aquatic environment is between about pH 6.5 to about pH 8.5, optionally between about pH 7.0 to about pH 8.0, or optionally between about pH 7.5 to about pH 8.0.

Further provided is a delivery matrix as defined herein, for use in aquatic environments. It may be that the temperature of the aquatic environment is between about 10° C. to about 25° C., optionally about 14° C. to about 21° C., or optionally about 16° C. to about 18° C.

Further provided is a formulation comprising the delivery matrix as defined herein, wherein the delivery matrix comprises 10% w/v carboxymethylcellulose and $10^{-4}$ mol/L of UDP:UTP in a ratio of 4:1. Optionally, it may be that the formulation comprises the delivery matrix as defined herein, wherein the delivery matrix comprises 10% w/v medium viscosity carboxymethylcellulose and $10^{-4}$ mol/L of UDP:UTP in a ratio of 4:1.

According to a further aspect of the invention, there is provided a tablet formulation comprising a delivery matrix as described herein. It may be that the tablet formulation of the delivery matrix is encased in a sugar coating.

According to a further aspect of the invention, there is provided a method for preparing a delivery matrix as described herein, wherein the delivery matrix is frozen at about less than 0° C., optionally about −20° C., for about 2 h, and then lyophilised for about 12 h.

According to a further aspect of the invention, the delivery matrices can be stored at less than 0° C., preferably about −20° C., for up to about 24 months. It may be that the delivery matrices can be stored at about −20° C. for up to about 18 months. It may be that the delivery matrices can be stored at about −20° C. for up to about 12 months. It may be that the delivery matrices can be stored at about −20° C. for up to about 6 months. It may be that the delivery matrices can be stored at about −20° C. for any time up to about 6 months.

According to a further aspect of the invention, there is provided a method of preparing a delivery matrix as described herein, the method comprising the steps of:
A) mixing the carbohydrate derivative, the at least one semiochemical and water until thoroughly combined;
B) aliquoting the delivery matrix mixture resulting from step A) to an individual mould; and
C) freezing the delivery matrix mixture resulting from step B).

Further provided is a method of preparing a delivery matrix according to the preceding paragraph, wherein step A) comprises mixing 10% w/v carboxymethylcellulose and $10^{-4}$ mol/L of UDP:UTP in a ratio of 4:1 in water until thoroughly combined. Optionally, it may be that step A) comprises mixing 10% w/v medium viscosity carboxymethylcellulose and $10^{-4}$ mol/L of UDP:UTP in a ratio of 4:1 in water until thoroughly combined. Optionally, it may be that step A) comprises mixing 10% w/v medium viscosity carboxymethylcellulose and $10^{-4}$ mol/L of UDP:UTP in a ratio of 4:1 in seawater until thoroughly combined. Optionally, it may be that step B) comprises aliquoting about 1 mL of the delivery matrix mixture resulting from step A) to an individual mould. Optionally, it may be that step C) comprises freezing the delivery matrix mixture resulting from step B) at about -20° C. Optionally, it may be that step C) comprises freezing the delivery matrix mixture resulting from step B) at about -20° C. for about 2 h. Optionally, it may be that the method of preparing a delivery matrix according to the preceding paragraph further comprises step D), wherein step D) comprises lyophilising the frozen delivery matrix resulting from step C). Optionally, it may be that step D) further comprises lyophilising the frozen delivery matrix resulting from step C) for about 12 h.

According to a further aspect of the invention, there is provided a method for trapping a specific species of at least one aquatic organism, said method comprising delivering an effective amount of the delivery matrix as described herein, in an aquatic environment.

The following definitions shall apply throughout the specification and the appended claims.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more of" the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should he understood to have the same meaning as "and/or" as defined above. For example, when separating items in a list, "or" or "and/or" shall he interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about", as used herein, in association with numeric values or ranges, reflects the fact that there is a certain level of variation that is recognised and tolerated in the art due to practical and/or theoretical limitations. For example, minor variation is tolerated due to inherent variances in the manner in which certain devices operate and/or measurements are taken. In accordance with the above, the phrase "about" is normally used to encompass values within the standard deviation or standard error.

Throughout the description and claims of this specification, the words "comprise", "comprising", "consisting of", "contain" and variations of them mean "including but not limited to", and they are not intended to (and do not) exclude other active ingredients, moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B", or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "effective" can mean, but is in no way limited to, that amount/dose of the active ingredient, which, when used in the context of its intended use, effectuates or is sufficient to have an appropriate effect (e.g. prevent, inhibit the occurrence, ameliorate, delay or stop) on its intended subject. The term effective subsumes all other effective amount or effective concentration terms, e.g., "effective amount/dose", which are otherwise described or used in the present application.

As used herein, unless defined otherwise in a claim, the term "optionally" means that the subsequently described event(s) may or may not occur, and includes both event(s) that occur and event(s) that do not occur.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Particular non-limiting examples of the present invention will now be described with reference to the following drawings, in which:

FIG. 2 shows the total number of female shore crabs (*Carcinus maenas*) caught over 3 days by sex and size. Treatments consisted of a positive control (bait), a negative control delivery matrix (no scent), and a test delivery matrix (pheromone). The bars in each of the three sizes of males tested are presented in that order: Bait, No Scent, Pheromone. Size categories for each sex are: small <50 mm; medium 50 mm to 70 mm; and large >70 mm carapace width.

In FIG. 5 the bars in each sex tested are presented in the order Attracted, No Response (all the male crabs were attracted). In FIG. 6 one female displayed "ignore" behaviour; 11 females displayed "investigate" behaviour; 9 males displayed "investigate" behaviour; 3 females displayed "attack, take, taste" behaviour; and 6 males displayed "attack, take, taste" behaviour.

EXPERIMENTAL

EXAMPLE 1

Samples and Sample Preparation

The delivery matrix samples used throughout this section were prepared as follows, unless otherwise specified:

Test delivery matrices: 10% w/v medium viscosity carboxymethylcellulose (purchased from Sigma, C-4888), $10^{-4}$ mol/L of 4:1 UDP:UTP and water were mixed until thoroughly combined;

Negative control delivery matrices: 10% w/v medium viscosity carboxymethylcellulose (purchased from Sigma, C-4888) was prepared in water; and Food cue delivery matrices: 10% w/v medium viscosity carboxymethylcellulose (purchased from Sigma, C-4888), $10^{-4}$ mol/L of glycine and betaine, and water were mixed until thoroughly combined. When glycine and betaine were used in combination, they were used in equal quantities in a 1:1 ratio.

The test delivery matrices, negative control delivery matrices and food cue delivery matrices were prepared as specified in the preceding paragraph. 1 mL of each delivery matrix was then aliquoted into a 1 mL moulds, which were frozen at −20° C. for 2 h, then lyophilised overnight (for about 12 h), ready for experimentation.

In addition, about 250 g of tuna bait was used for the positive control samples.

Flume Tank, Lab-Based Trial

A test delivery matrix as described herein, was buried under gravel in a flume tank filled with water to prevent the delivery matrix from floating to the surface. A male specimen of *Carcinus maenas* was placed in the tank and left to acclimatise.

The male crab was observed over 10 minutes, to determine whether it was attracted to the test delivery matrix. If there was no reaction from the crab, the experiment was repeated. In total, the experiment was performed on 20 different crabs and repeated 3 times (n=60).

Field-Based Trial (1)

The experiment was performed over 3 days, with 3 different treatments. Fukui fish traps were used to trap the shore crabs. The following treatments were used, as described herein:

(i) Negative control delivery matrices (no scent, prepared with saltwater);
(ii) Positive control (tuna bait); and
(iii) Test delivery matrices (post-moult pheromone).

The treatments and traps were replenished after each day of testing. Table 1 summarises the experimental design used:

TABLE 1

Experiment design used for Oregon Field-based Trial (1). Treatments and traps were replenished after day 1 and day 2.

| | Treatment | | |
|---|---|---|---|
| Day | Positive Control | Negative Control Delivery Matrices | Test Delivery Matrices |
| 1 | 6 traps | 6 traps | 6 traps |
| 2 | 6 traps | 6 traps | 6 traps |
| 3 | 6 traps | 6 traps | 6 traps |
| Total | 18 traps | 18 traps | 18 traps |

All of the shore crabs trapped in the study were also categorised by sex and size. The size categories used for each sex were: small <50 mm; medium 50 mm to 70 mm; and large >70 mm carapace width.

Field-Based Trial (2)

The experiment was performed over 3 days, and repeated over 4 different time points. Fukui fish traps were used to trap the shore crabs, and 15 to 18 traps were used per treatment. The following 4 treatments were used:
(i) Negative control delivery matrices (no scent, prepared with saltwater);
(ii) Positive control (tuna bait);
(iii) Test delivery matrices (post-moult pheromone); and
(iv) Food cue delivery matrices (glycine and betaine in 1:1 ratio).

Results and Discussion

Flume Tank, Lab-Based Trial

TABLE 2

Results for Flume Tank, Lab-based Trials - individual shore crabs were tested and behaviour recorded in categories as listed. In total 20 shore crabs were tested. This 20-shore crab trial was repeated 3 times (total n = 60 shore crabs).

| Replicate | Dug up = positive response | Ignored | Moved to = attraction |
|---|---|---|---|
| 1 | 1 | | 1 |
| 2 | 1 | | 1 |
| 3 | | 1 | 1 |
| 4 | | | 1 |
| 5 | 1 | | 1 |
| 6 | 1 | | 1 |
| 7 | 1 | | 1 |
| 8 | | | 1 |
| 9 | | | 1 |
| 10 | | | 1 |
| 11 | 1 | | 1 |
| 12 | | | 1 |
| 13 | 1 | | 1 |
| 14 | 1 | | 1 |
| 15 | 1 | | 1 |
| 16 | 1 | | 1 |
| 17 | 1 | | 1 |
| 18 | 1 | | 1 |
| 19 | 1 | | 1 |
| 20 | 1 | | 1 |
| Total responding out of 20 | 14 | 1 | 20 |

No interest was seen in the test delivery matrix until after approximately 7 minutes. The inventors observed that at close ranges, the test delivery matrix elicits a reaction from the male shore crab, as the concentration of semiochemical may be higher. The male crabs either moved towards the test delivery matrix, or attempted to dig the test delivery matrix from the gravel. It is hypothesised that the male crabs therefore can detect a dead female shore crab or part of one undergoing ecdysis (since they are able to detect the test delivery matrix that includes 4:1 UDP:UTP). However, after moving to the test delivery matrix, all male specimens left the area of the delivery matrix once the female shore crab could not be 'found'.

This experiment was repeated a further two times (3 times in total, each experiment with 20 crabs, i.e. n=60 crabs), with almost identical results to those presented in Table 2. The results of the three repeats are summarised in Table 3 below:

TABLE 3

Total Results for Flume Tank, Lab-based Trials - individual shore crabs were tested and behaviour recorded in categories as listed. In total 20 shore crabs were tested per Trial (total n = 60 male shore crabs).

| Trial | Dug up = positive response | Ignored | Moved to = attraction |
|---|---|---|---|
| 1 | 14 | 1 | 20 |
| 2 | 14 | 1 | 19 |
| 3 | 15 | 1 | 19 |
| Total responding out of 60 | 43 | 3 | 58 |

As demonstrated by the data presented in Table 3, the male shore crabs moved to the test delivery matrix 96.66% of the time, and 71.66% of the male shore crabs attempted to dig up the test delivery matrix in order to mate. These results demonstrate the efficacy of the test delivery matrices comprising $10^{-4}$ mol/L of 4:1 UDP:UTP. Without being bound to theory, it is hypothesised that there is not a 100% response to the delivery matrices, as the status of male shore crabs can directly affect how they respond to chemical cues. For example, subdominant male shore crabs may be least affected by chemical cues for feeding and reduction, as demonstrated, for example, in Fletcher, N. et al., Anim. Behay. (2009) 77: 357-361.

Field-Based Trial (1)

TABLE 4

Average number of shore crabs caught for three treatments over three consecutive days of Oregon Field-based Trial (1).

| | Average # of shore crabs caught per trap per day | | |
|---|---|---|---|
| Day | Positive Controls | Negative Control Delivery Matrices | Test Delivery Matrices |
| 1 | 11.1 | 6.8 | 12.7 |
| 2 | 10.8 | 5.0 | 9.7 |
| 3 | 11.1 | 5.5 | 21.5 |
| Mean ± 95% CI | 11.0 ± 0.5 | 5.7 ± 2.8 | 14.6 ± 5.1 |

The inventors found, as highlighted in Table 4, that a higher number of shore crabs were attracted to the test delivery matrices (i.e. carboxymethylcellulose delivery matrices comprising $10^{-4}$ mol/L of 4:1 UDP:UTP, as described herein), when compared to the negative and positive controls. Tuna bait (positive control) is the common method used in trapping crustaceans. However, this method is not species specific, as it is costly and uses valuable resources such as tuna. Therefore, these results show that the pheromone delivery matrices are more effective for trapping shore crabs when compared to this commonly used method.

Figure 1:
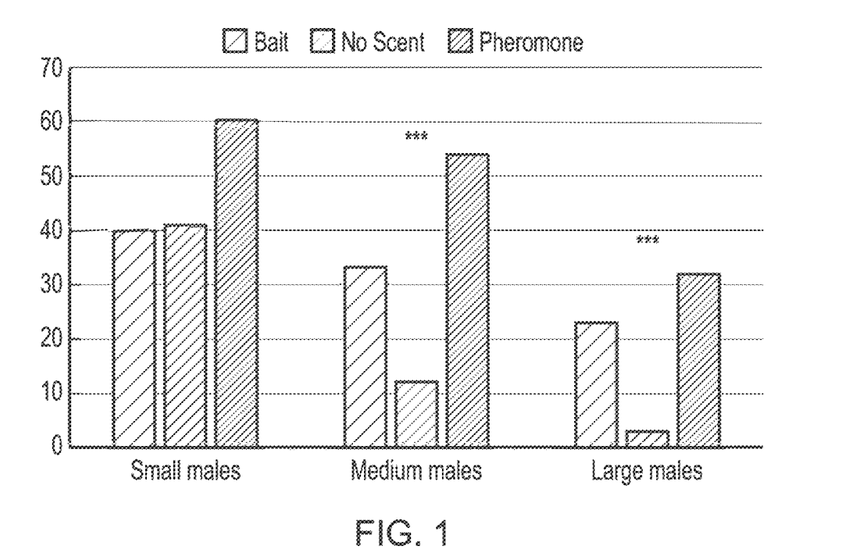
FIG. 1 shows the total number of male shore crabs (*Carcinus maenas*) caught over 3 days by sex and size. Treatments consisted of a positive control (bait), a negative control delivery matrix (no scent), and a test delivery matrix (pheromone). The bars in each of the three sizes of males tested are presented in that order: Bait, No Scent, Pheromone. Size categories for each sex are: small <50 mm; medium 50 mm to 70 mm; and large >70 mm carapace width.
Figure 2:
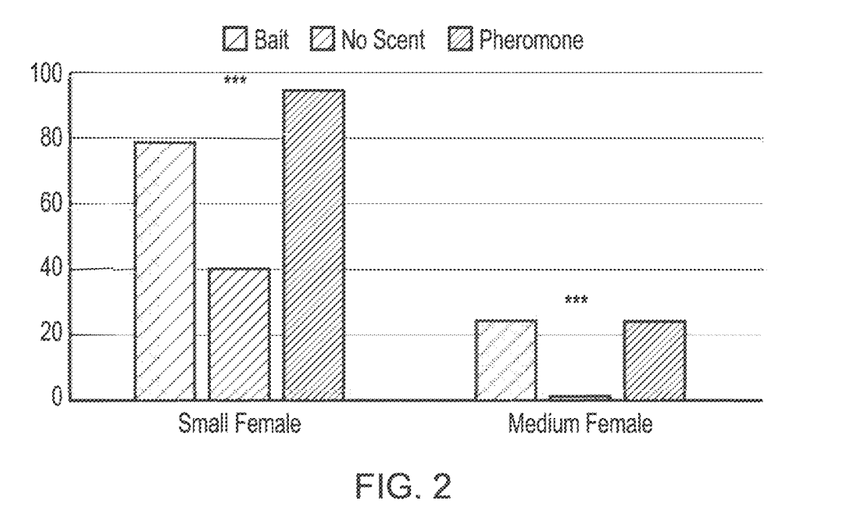

Additionally, the inventors found that the pheromone delivery matrices attracted medium female and smaller female shore crabs (FIG. 2), in addition to male shore crabs (FIG. 1). This is a 'snowball effect' where initially large sexually active males are trapped due to the female sex pheromone, which subsequently attracts females to the smell of such a large aggregation of males. Small female shore crabs are often cannibalistic and attack freshly moulted females, and as such, are also attracted to the post-moult pheromone delivery matrices. The attraction of female, in particular medium female, shore crabs to a trap that includes high levels of female pheromone is surprising as it would be expected that the presence of female pheromones would ordinarily deter other female, in particular medium female, shore crabs. For all but the small males, the pheromone delivery matrices attracted significantly more crabs when compared to the negative control delivery matrices, as determined by Chi-squared tests (FIG. 1).

Field-Based Trial (2)

water level to ensure specimens cannot see the external environment (thus reducing cofounding environmental factors).

A sample of 30 crabs (15 male/15 female *Carcinus maenas*) was used. In each test, a single specimen was placed into the centre of the tank, held under a custom-made container (plastic box) and given no longer than 2 minutes to acclimatise (to ensure water pH is not affected by $CO_2$ levels from specimens' respiration/waste products). 1ml of test solution [either; control (artificial seawater), positive cue (mussel meat pulp), or potential negative cue (injury/predator/alarm cue), or test sample as described below] was pipetted onto a small piece of sponge approximately 30 mm×30 mm, held within a stainless steel tea strainer (to ensure sponge does not float) and placed into one side of the tank (either 'Point A' or 'Point B', alternating sides between positive/negative/controls that are being tested in repeat tests to ensure there is no preference to one side of the tank). The central container was removed and the specimens' behaviour towards the sponges at each marked point was visually observed and timed using a stopwatch, over a time period of 5 minutes per test, with behaviour graded using the following numerical key:

TABLE 5

Average number of shore crabs caught for different treatments over three consecutive days of Oregon Field-based Trial (2) (CPUE = catch per unit effort)

| Trial # | Dates | Sites | Treatments (CPUE) | | Temperature ° C. | pH |
|---|---|---|---|---|---|---|
| 1 | Sep. 12-15, 2017 | History Museum, Coos Bay | Test delivery matrices: | (0.86) | 19.3-21.0 | 7.27-7.75 |
| | | | Positive control: | (0.45) | | |
| | | | Negative control delivery matrices: | (0.43) | | |
| 2 | Oct. 14-17, 2017 | History M. Coos Bay Hatfield, Yaquina | Test delivery matrices: | (1.09) | 14.0-15.5 | 7.95-7.98 |
| | | | Food cue delivery matrices: | (0.94) | | |
| | | | Negative control delivery matrices: | (0.67) | | |
| 3 | Jun. 16-18, 2018 | Sally's Bend, Yaquina | Test delivery matrices: | (14.61) | 17.5 | 7.87 |
| | | | Positive control: | (11.05) | | |
| | | | Negative control: | (5.70) | | |
| 4 | Jul. 29-Aug. 1, 2018 | Sally's Bend, Yaquina | Positive control: | (11.90) | 14.9-16.1 | 7.70-7.83 |
| | | | Food cue delivery matrices: | (4.00) | | |
| | | | Negative control: | (5.50) | | |

The inventors found, as highlighted in Table 5, that a higher number of shore crabs were attracted to the post-moult pheromone delivery matrices (i.e. carboxymethylcellulose delivery matrices comprising 4:1 UDP:UTP, as described herein), when compared to the negative and positive controls during breeding season (trial #3). During breeding season, the shore crab numbers are higher in the area, as both the temperature and pH of the water are at optimal levels.

EXAMPLE 2

A lightweight translucent plastic storage container [500mm length/320mm width/150mm height] was used as a tank, containing 10 litres of artificial seawater at a pH of 8.1/temperature 15-16° C. (to emulate current ocean pH and the acclimated temperature of specimens respectively). The exterior of the tank was wrapped in black duct tape up to the Key:
1=Ignore
2=Avoid/Move Away
3=Investigate
4=Attack/Take/Taste In the event of a majority 'behaviour 2' to either cue from specimens, a follow-up experiment using the same setup and method was carried out, using a solution consisting of a mix of positive (feeding) and negative (alarm) cues, to determine if the negative is sufficient to deter feeding/attraction. The ratio of 'positive' to 'negative' in this mix can be adjusted with each subsequent test with the objective being the avoidance of Point B by specimens with a starting location of Point A, despite the presence of food.

Field Trial 3: 2-phenylethylamine

Figure 3:
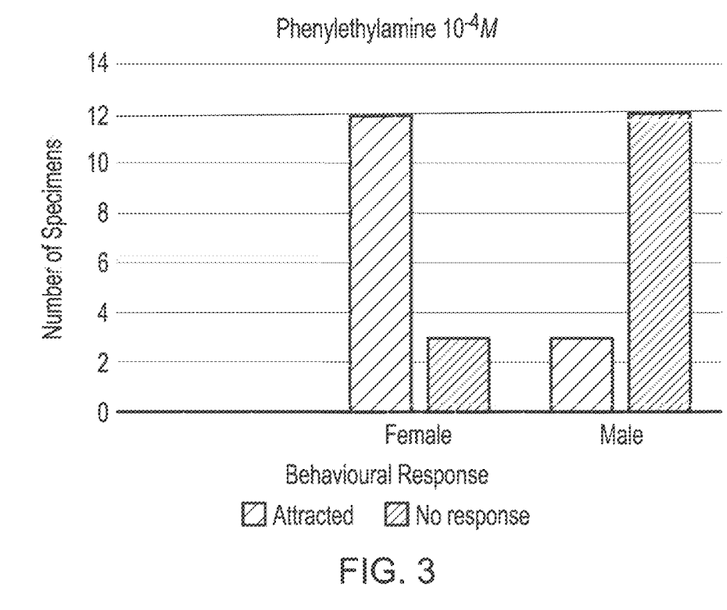
FIGS. 3 and 4 show bar charts showing the difference in attraction by male and female *Carcinus maenas* to PEA at two different molecular concentrations. N=15 Shorecrabs tested per sex. The bars in each sex tested are presented in the order Attracted, No Response.
Figure 4:
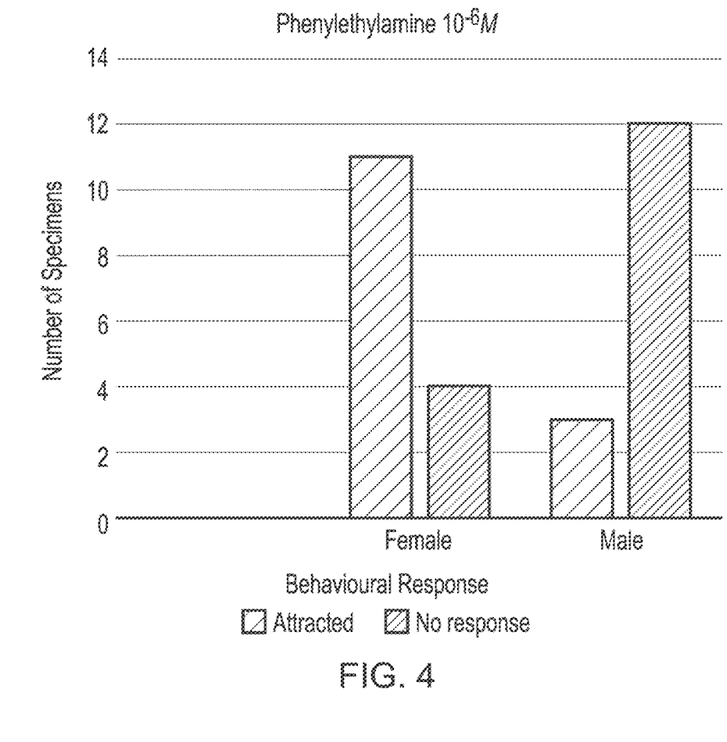

These data show (see FIGS. 3 and 4) that PEA is a sex specific attractant for mature female crabs whilst males ignore it. 12 of the 15 females (80%) tested were attracted at PEA $10^{-4}$M whilst only 3 of 15 males (20%) were. 11 of the 15 females (73.3%) tested were attracted at PEA $10^{-6}$M whilst only 3 of 15 males (20%) were. This shows a 6.7% drop in attractiveness from females at the lower concentration, but still significantly higher than male attraction.

For statistical analysis, a Fisher's exact test is used due to small sample sizes of 15×2=30 individuals.

Field Trial 4: Chondroitin Sulphate

Figure 5:
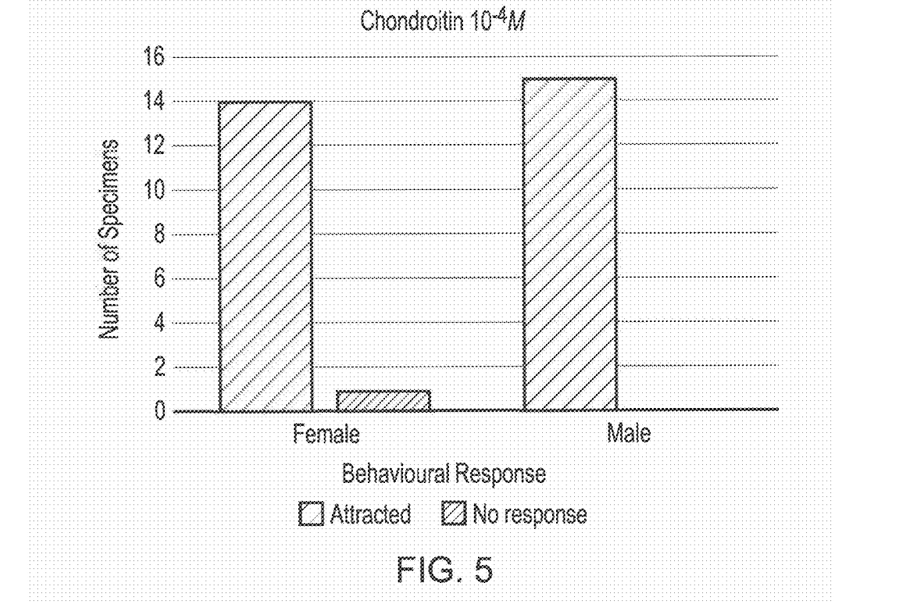
FIGS. 5 and 6 show bar charts showing the difference in attraction and the behavioral responses observed by male and female *Carcinus maenas* to chondroitin sulphate at $10^{-4}$ M.
Figure 6:
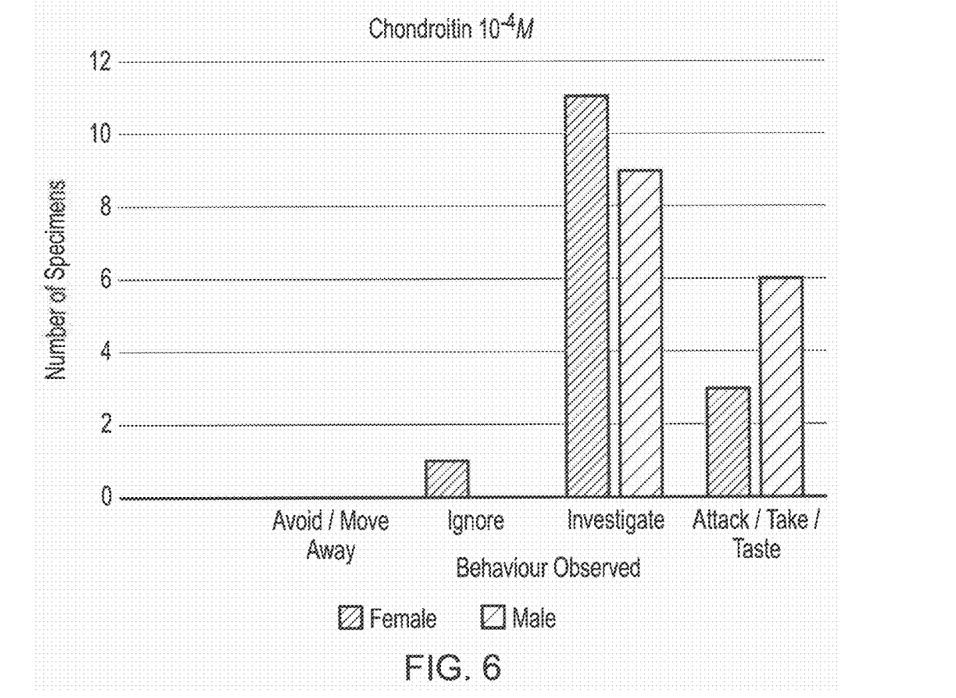

These data show (see FIGS. 5 and 6) that 14 of the 15 females (93%) and all 15 males (100%) tested were attracted to Chondroitin Sulphate $10^{-4}$M. All these crabs then also either investigated the chemical source or even tried to eat/attack it. It shows this compound is a cue that the crabs relate to injured animals which are 'easy prey' for them.

EXAMPLE 3

Testing Glutathione (GSH) Upon Shore Crabs (*Carcinus maenas*) Behaviour:

Methods:

The crabs that were used for this study were kept in tanks at the current pH level (8.2) so they were not acclimatised to the lower pH level that was being tested. The crabs were also not fed for a few days before the study and for the duration of the study. The males were also stored separately to the females. All this was designed to ensure the animals were hungry or trying to find a mating partner.

Chemicals:

In this study freeze dried chemical gels were used, the gels were made using carboxy-cellulose infused with the odours to be tested. The cue tested was a reduced glutathione (GSH), this was used at a concentration of $10^{-4}$ M and compared also to the pheromone gel which was 4:1 uridine diphosphate and uridine triphosphate, the concentration that was used was $10^{-4}$ M and negative controls. Positive controls were either feeding cues glycine or mussel odour (*Mytilus edulis*).

Bioassay:

Testing started by examining the pheromone gel Vs control gel experimental condition. The first step was placing the gels into plastic tea strainers, these allowed the gels to be buried into the sediment and remain there. The tea strainers were placed at the tips of the two Y-olfactometers used [FIG. 7], with the flow running over them to help them diffuse into the water. After every few crabs, the control and the cue were swapped around, this was to reduce the risk of any anomalies, in case the crabs favoured the conditions in one side of the tank.

The crabs were randomly selected from a large storage tank (pH 8.2) for the bioassays. Measurements of the crabs' carapaces width were taken and recorded before they were placed into the tank. The crabs were placed into a plastic tube in the tank and left for 2 minutes to allow them to acclimatise. The tube was then removed, allowing the crabs to move and a timer was started. The data that was recorded was:

the initial reaction of the crabs (seconds) which was when their antennules started rapidly moving;

whether they went to the cue, the control or neither was also recorded; the reaction that they had at the cue (whether they had no visible reaction, grabbed the cue; also if animals buried themselves there, or wafted frequently (moving chelipeds to create a current which is a typical way of sending their own scent towards a receiver, so an answer to a pheromone cue) or ran around it;

and finally how long it took them to reach the cue.

Figure 7:
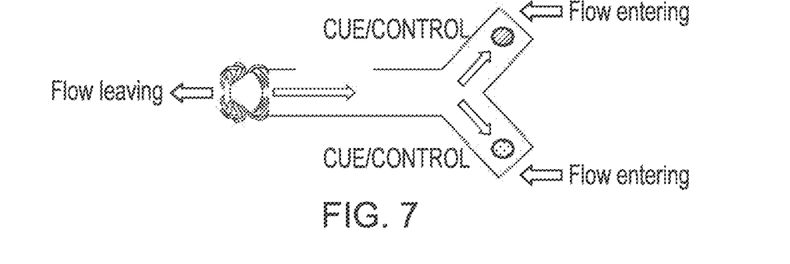
FIG. 7 shows the setup of the Y-shape olfactometer used.

Flow was set up within both tanks using seawater (temperature 15-20 degrees), so that it entered the tank at the tips of the Y and left at the base [FIG. 7]. The flow rate was 1 litre per minute. The flow allowed the chemical cues to be diffused into the tank at an equal rate. It also helped to remove the scents that may have been left behind by the crabs that had previously been tested. Both tanks were filled to 12cm. After the basics had been set up within the tanks, the base of the tank was covered in a layer of sediment around 2.5 cm thick, to create a more natural environment for the crabs. It also allowed the chemical cues to be placed more easily. Both tanks were set up identically, the only difference in the tanks was the water pH levels in them.

Figure 8:
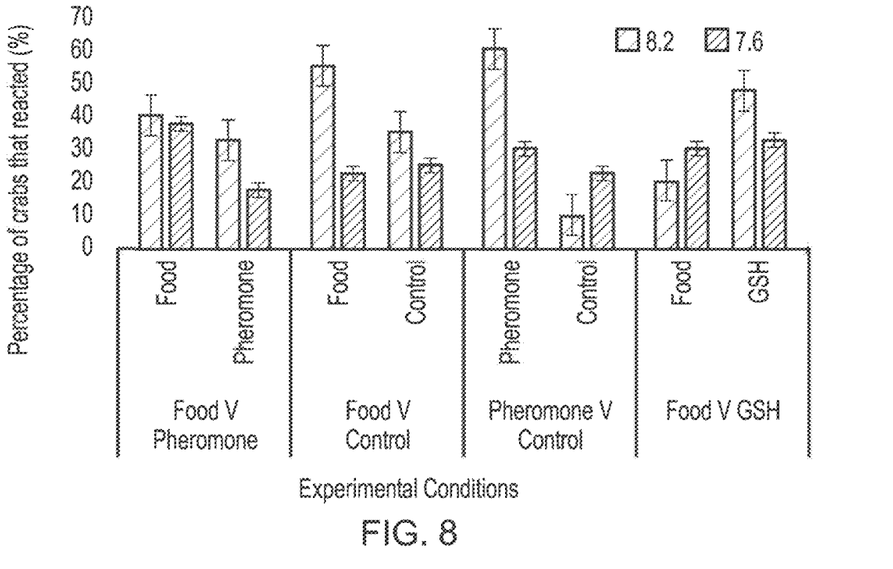
FIG. 8 shows the percentage of crabs that reacted (Ran to cue or the control gel) to each cue within the four different conditions. Of each pair of bars, the left bar is pH 8.2 and the right bar is pH 7.6. 40% of crabs in pH 8.2 reacted to the food not the pheromone, in pH 7.6, 37.5% reacted to food. In the pheromone V control condition, 60% of crabs in the higher pH reacted, only 30% reacted in the lowered pH. When food and GSH was tested, 47.5% of crabs in the higher pH reacted to GSH. The error bars show standard error.

Results:

The data show (FIG. 8) that when a negative control was added in one arm of the olfactometer and the 2 main cues tested—the pheromone mix as well as the Glutathione were added at the other arm significantly more crabs moved to the test arm. (control vs GSH (data not shown)/Control vs Pheromone, Food vs Control).

GSH was even preferred over food (mussel odour) albeit, at the concentrations used in this experiment, when the pH was dropped to ocean acidification levels this preference disappeared. A pH of 7.6 was used to simulate the forecast acidification of the ocean due to climate change in the year 2100. Pheromone mix was as attractive as food and again at reduced pH the attractiveness of the pheromone decreased compared to food (mussel).

EXAMPLE 4

Testing Glutathione (GSH) Upon Hermit Crab *Pagurus bernhardus* Behaviour:

Chemicals

A stock solution of $10^{-3}$ M of L-glutathione (GSH, reduced glutathione) was made using Glutathione manufactured by Sigma. 30.7 mg was added to 100 ml of (normal pH), filtered (using a 0.22 µm microfilter) seawater. This was then diluted down to $10^{-5}$ M and $10^{-6}$ M by using a Gilson pipette and small vials.

Behavioural Bioassays

Some unmarked crabs were selected and brought to the lab for testing. In order to see the general actions of crabs upon sensing food, the crabs were added to glass dishes (containing normal seawater) and 100 µl of mussel extract (using a Gilson pipette) was added to a small piece of filter paper, which was then placed at one edge of the dish. The hermit crabs were then watched to see the various reactions they had to sensing food.

A 27.7 cm×17.7 cm tank was filled with one litre of seawater at the appropriate pH. The pH of the water was controlled using a $CO_2$ bubbler and tested using an electronic pH meter. Furthermore, the salinity was tested using a refractometer. This consistency is important in order to ensure the signalling molecules are "diluted" to the same extent. Most of the tank is covered with black paper to prevent reflections causing stress on the hermit crabs. There are rectangular marked areas at either end of the tank, which is where the small sections of filter paper will be placed (at one end the paper soaked in the glutathione or mussel extract (a positive control—mussel extract made of *Mytilus edulis* is a known feeding cues) and at the other end a blank piece of paper in seawater (the negative control). The paper is small enough so that it is possible for the hermit crab to pick it up and try to eat it.

Figure 9:
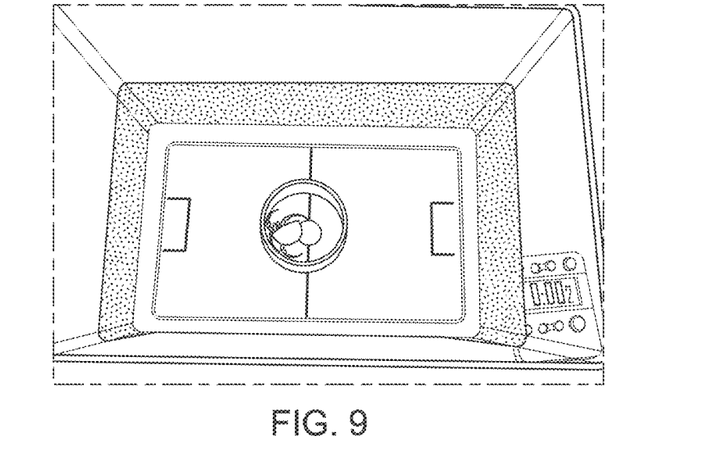
FIG. 9 shows the setup of the tank, with the hermit crab present in the middle in the small arena, the two pieces of filter paper either side of the tank and the stopwatch.

One of the pieces of paper is soaked in the chemical to be tested (100 μl glutathione or mussel extract using a Gilson pipette) the other one is a control blank. The hermit crab is placed in the small "arena" (see FIG. 9) in the middle of the tank and is left to start moving around (this takes into account the varying levels of "shyness" among the hermit crabs. Both pieces of paper are then placed onto either side of the tank (the control is placed first so the cue does not diffuse too early).

The timer is started and the tank is left in such a set up (see FIG. 9) for 30 seconds, so there is enough time for the cue to diffuse from the filter paper to the arena. The arena is then carefully removed. The hermit crab is then observed and the appropriate behaviours completed are ticked off in the lab book. The time is taken as soon as the hermit crab first touches any part of the paper.

TABLE 1

Behavioural responses of the hermit crabs with the addition of the cue (mussel extract) and level of response, ranging from 1 to 4, where 4 is the most intense response.

| Level of response | Description of behaviour |
| --- | --- |
| 1 | Increased movement of the second antennae. |
| 2 | Increased movement of the mouthparts. |
| 3 | Movement towards the cue. |
| 4 | Attempting to eat the paper doused in the cue. |

Results:

Positive controls at pH 7.7 (acidification) and 8.1 (current oceanic pH): mussel extract.

Figure 10:
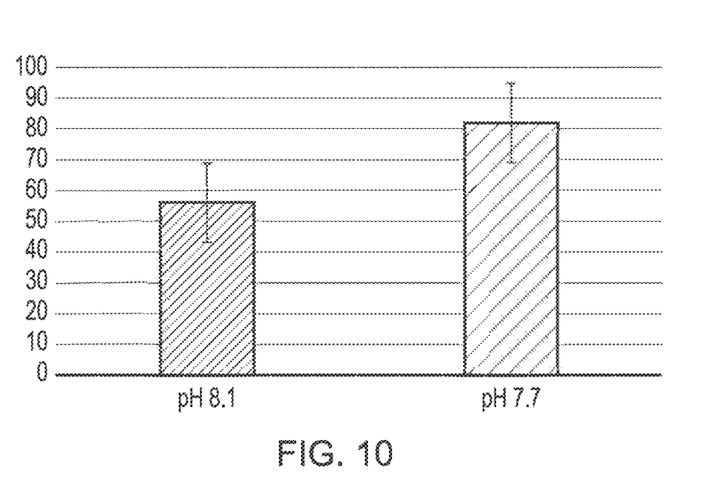
FIG. 10 shows the effect of pH on the average time taken for the hermit crabs to reach the section of filter paper with 100 µl of mussel extract. Time (in seconds) for hermit crabs to reach positive control (mussel odour; hermit crabs having been left in pH 7.7 seawater for 1 week to acclimate).

On average the hermit crabs did take longer to respond to the mussel extract (see FIG. 10) at pH 7.7 (81.9 seconds) than at pH 8.1 (55.9 seconds), however this was not statistically significant (two-tail t-Test: Two-Sample Assuming Equal Variances, P=0.287 3 s.f.). When the individuals are compared at the different pH's, the differences in time taken are not significant (two-tail t-Test: Paired two samples comparing means, P=0.113 to 3 s.f.).

Figure 11:
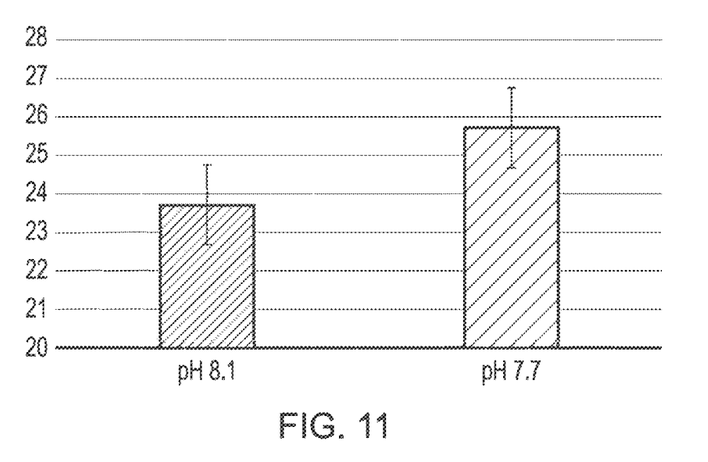
FIG. 11 shows the effect of pH on the average time taken for the hermit crabs to reach the section of filter paper doused in 100 µl of 10-6 M L-glutathione solution, (with the hermit crabs having been left in pH 7.7 seawater for 1 week).

Glutathione (GSH):

With the L-glutathione there was no statistical significance between the average times taken for the hermit crabs to reach the cue (two-tail t-Test: Two-Sample Assuming Equal Variances, P=0.880 3 s.f.). The times required to reach the paper were though significantly shorter for GSH than for the mussel extract at both pH levels (p<0.01) with 23.7 seconds at normal pH and 25.7 seconds at low pH vs 55.9 and 81.9 seconds for the mussel extract (see FIG. 11).

It will be appreciated by those skilled in the art that any number of combinations of the aforementioned features and/or those shown in the appended drawings provide clear advantages over the prior art and are therefore within the scope of the invention described herein.

The invention claimed is:

1. A method for trapping and/or attracting a female crustacean, said method comprising delivering an effective amount of a semiochemical selected from the group consisting of: 2-phenylethylamine, dopamine, L-DOPA, noradrenaline, chondroitin-sulfate, and glutathione to an aquatic environment.

2. The method of claim 1 which comprises: (1) delivering the effective amount of the semiochemical selected from the group consisting of: 2-phenylethylamine, dopamine, L-DOPA, noradrenaline, chondroitin-sulfate, and glutathione to an aquatic environment; and (2) removing the trapped female crustacean from the aquatic environment.

3. The method of claim 1 wherein the step of delivering the effective amount of the semiochemical to an aquatic environment involves adding the semiochemical to a trap that allows the female crustacean to enter, but does not allow the female crustacean to escape.

4. The method of claim 1 wherein the step of delivering the effective amount of the semiochemical to an aquatic environment involves adding the semiochemical to a trap that allows the female crustacean to enter, does not allow the larger female crustaceans to escape but allows smaller female crustaceans to escape.

5. The method of claim 1 wherein the female crustacean is selected from the group consisting of *Cancer magister, Cancer pagurus, Homarus americanus, Homarus gammarus, Penaeus vannamei, Penaeus monodon, Callinectes sapidus* (blue crab), *Necora puber* (swimming crab), *Maja brachydactyla* (spider crab), *Paralithodes camtschaticus* (red king crab), *Eriocheir sinensis* (mitten crab), *Panulirus* (spiny lobster), *Chionoecetes opilio* (snow crab), *Carcinus maenas* (shore crab) and *Paguroidea* (hermit crab).

6. The method of claim 1 wherein the semiochemical is selected from the group consisting of 2-phenylethylamine, dopamine, L-DOPA, and noradrenaline.

7. The method of claim 6 wherein the female crustacean is a *Carcinus maenas* (shore crab).

8. The method of claim 1, wherein the semiochemical is chondroitin sulphate.

9. The method of claim 8 wherein the female crustacean is a *Carcinus maenas* (shore crab).

10. The method of claim 1, wherein the semiochemical is glutathione.

11. The method of claim 10 wherein the female crustacean is a *Paguroidea* (hermit crab).

12. The method of claim 10 wherein the female crustacean is a *Carcinus maenas* (shore crab).

* * * * *